United States Patent [19]

Bauer

[11] Patent Number: 5,344,719

[45] Date of Patent: Sep. 6, 1994

[54] WELDING BAND

[75] Inventor: Horst Bauer, Lengerich, Fed. Rep. of Germany

[73] Assignee: Windmoeller & Hoelscher, Lengerich, Fed. Rep. of Germany

[21] Appl. No.: 18,551

[22] Filed: Feb. 17, 1993

[30] Foreign Application Priority Data

Feb. 24, 1992 [DE] Fed. Rep. of Germany ....... 4205583

[51] Int. Cl.$^5$ .................. H05B 3/12; B29C 65/22; B32B 15/18; B32B 15/20
[52] U.S. Cl. .................. 428/675; 428/677; 383/94; 156/583.1; 219/243
[58] Field of Search ............ 428/675, 614, 677, 931; 219/243; 156/583.1, 583.4; 383/94

[56] References Cited

U.S. PATENT DOCUMENTS

| | | | |
|---|---|---|---|
| 2,494,905 | 1/1950 | Shumann | 383/94 |
| 2,574,095 | 11/1951 | Langer | 219/243 |
| 2,596,933 | 5/1952 | Kirk | 156/583.1 |
| 3,005,402 | 10/1961 | Starger et al. | 219/243 |
| 3,253,122 | 5/1966 | Kochmer et al. | 219/243 |
| 3,617,696 | 11/1971 | Reenstra | 156/583.2 |
| 3,703,427 | 11/1972 | Sellers et al. | 219/243 |
| 3,779,838 | 12/1973 | Wech | 156/583.1 |
| 4,010,063 | 3/1977 | Natter | 156/510 |
| 4,445,025 | 4/1984 | Metz | 156/583.7 |
| 4,735,675 | 4/1988 | Metz | 156/583.4 |
| 5,149,943 | 9/1992 | Kupcikevicius et al. | 156/583.2 |

FOREIGN PATENT DOCUMENTS

| | | |
|---|---|---|
| 3629497 | 3/1988 | Fed. Rep. of Germany . |
| 1030789 | 5/1966 | United Kingdom . |
| WO87/07212 | 12/1987 | World Int. Prop. O. . |

*Primary Examiner*—John Zimmerman
*Attorney, Agent, or Firm*—Jacobson, Price, Holman & Stern

[57] ABSTRACT

The invention relates to a welding band for welding synthetic resin film including a steel band, which is coated in its end parts with a thin copper layer. To attain the aim of improving the working life of such a welding band, the thin copper layer is covered with an even thinner metallic layer, preferably of nickel.

3 Claims, 1 Drawing Sheet

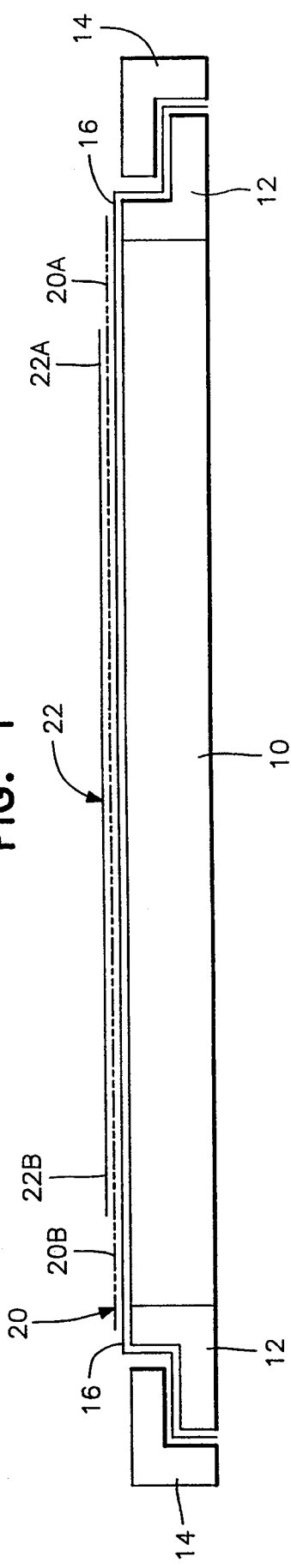
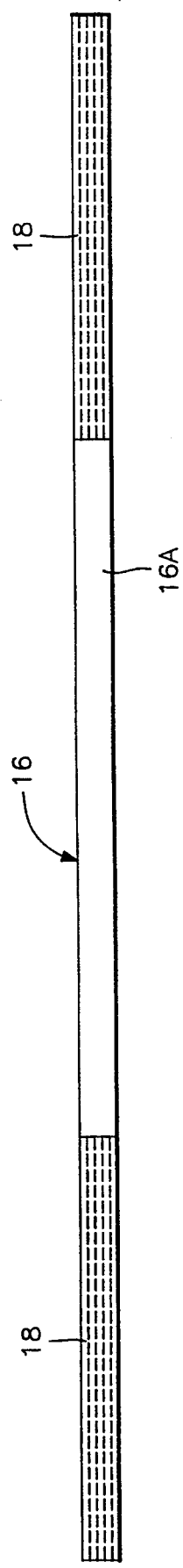
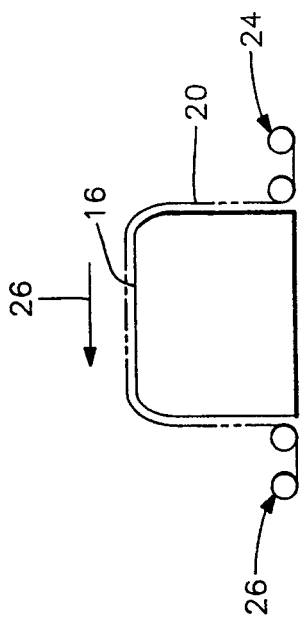

WELDING BAND

FIELD OF THE INVENTION

The invention relates to a welding band for welding synthetic resin films, comprising a steel band or tape, which in its end parts is coated with a thin copper layer and a protective layer over the thin copper layer.

BACKGROUND OF THE INVENTION

Welding bands are utilized in equipment for the welding of synthetic resin film as is for instance described in European patent publication 0 155 548 B1. In this equipment, continuous webs of film, for example tubular webs, are welded into bags. The correspondingly folded film web is conveyed until the point to be welded is located between suitable welding jaws. The welding band is arranged on the welding jaws and is in the form of a resistance heating element. The welding band is heated and the film web to be welded is clamped between the opposed welding jaws. The heat of the welding band is transmitted to the film so that it is welded.

The welding band consists of a narrow steel band or tape. A TEFLON band extends between the welding band and the film web to be welded. This TEFLON band extends over the entire welding jaw, that is to say beyond the edge of the film web to be welded. If the entire welding band is manufactured of steel, there will be local overheating in the edge portion of the tubular film web so that there may be damage to the TEFLON bands or even short-circuiting. As a remedy in this respect it has already been proposed to coat the end parts of the welding band with a thin copper layer, which provides satisfactory thermal and electrical conductivity. Owing to this improved thermal conductivity local overheating of the welding band is prevented.

If such welding bands are utilized for weldingly sealing bags filled with corrosive substances, as for instance salts, there is the problem that after a relatively short period of use, the copper layer is lost owing to corrosion. This in turn leads to local overheating of the welding band and, as a result, damage to the TEFLON tape.

SUMMARY OF THE INVENTION

One object of the present invention is therefore that of providing such an improvement in the welding band of the type initially mentioned that the welding band may also be utilized for weldingly sealing film bags which are filled with chemically reactive and corrosive substances.

In accordance with the invention this object is to be achieved by coating the thin copper layer with an even thinner metal layer. The invention is based on the surprising discovery that a suitable extremely thin metal layer on the copper layer increases the resistance of the copper layer towards chemically corrosive materials, such as for instance salts. On the other hand the good thermal and electrical conductivity, which is due to the copper layer, is not impaired. The working life of the welding bands in welding stations for welding bags filled with corrosive materials may be increased by a factor of 10. Owing to this, servicing is less frequent with the result that the operating costs are substantially reduced.

The copper layer may have a thickness of approximately 40 to 60 μm and preferably approximately 50 μm. The metallic protective layer arranged thereon may have a thickness of approximately 2 to 5 μm and preferably approximately 3 μm.

In cases in which the corrosive materials are inorganic salts, the metallic protective layer is preferably in the form of nickel.

Further advantageous developments and convenient forms of the invention will be understood from the following detailed descriptive disclosure of one embodiment thereof in conjunction with the accompanying drawings.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a lateral elevation of part of a welding station, in which the welding band in accordance with the invention is employed.

FIG. 2 is a plan view of a welding band in accordance with the invention.

FIG. 3 is a diagrammatic cross section taken through a welding jaw with a TEFLON band thereon.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1 only a part of a welding station is illustrated. On the ends of the welding jaw 10 are arranged respective insulators 12. On the insulators 12, the ends of a welding band 16 are gripped by terminals 14. The welding band 16 extends along the welding jaw 10, as is diagrammatically illustrated in FIG. 1.

A TEFLON band 20 extends over the welding band 16. In the sectional view in accordance with FIG. 3 there is an indication how the TEFLON band 20 is arranged over the jaws 10 and welding band 16. The TEFLON band is drawn off from a supply roll 24 and taken up by a further roll 26. In this respect the TEFLON band 20 is moved on one step after each welding operation as indicated by the arrow 26. In FIG. 1, the film 22 to be welded will be seen over the TEFLON band 20. From the proportions in FIG. 1 it is clear that the lateral ends 20A and 20B of the TEFLON band 20 extend as far as a position adjacent to the insulators 12 and consequently over the edge parts 22A and 22B of the tubular film web 22 to be welded.

In FIG. 2, the welding band 16 in accordance with the invention is depicted prior to placing it in position of use. The welding band illustrated here is employed for producing a transverse weld seam. Naturally, it is possible for the welding band 16 to be modified in its configuration and consequently furthermore utilized for producing a corner weld. The welding band 16 illustrated in FIG. 2 is—as shown in FIG. 1—used for the production of transverse weld seams. The welding band 16 consists of a steel tape or band, which has respective copper-plated ends 18. The band has in the present working embodiment a breadth of 6 mm and a length of the copper-plated portion of respectively 120 mm. The part 16A between the copper-plated portions is 420 mm long. The thickness of the welding band 16 is equal to approximately 0.5 mm. The copper layer of the copper-plated portion 18 is approximately 50 μm thick. The copper layer 18 bears a nickel layer of approximately 3 μm thereon.

Tests with the above-mentioned welding band in a sack filling station in which inorganic salts were bagged indicated that welding bands having only a copper layer at the ends had to be replaced after 63,000 welding operations. With the welding band in accordance with the invention, it was possible to perform over 700,000 welding operations without the copper layer 18 of the welding band 16 becoming defective.

Having described the invention, many modifications thereto will become apparent to those skilled in the art to which it pertains without deviation from the spirit of the invention as defined by the scope of the appended claims.

I claim:

1. A welding band for welding synthetic resin film, said welding band comprising:
   a steel band having end parts coated with a copper layer, said copper layer being coated with a metallic protective layer consisting of nickel having a thickness less than a thickness of said copper layer.

2. The welding band as claimed in claim 1, wherein said copper layer has a thickness of 40 to 60 μm and said metallic protective layer arranged thereon has a thickness of 2 to 5 μm.

3. The welding band as claimed in claim 2, wherein said metallic protective layer has a thickness of 3 μm.

* * * * *